US 6,880,945 B2

(12) United States Patent
Knaack et al.

(10) Patent No.: US 6,880,945 B2
(45) Date of Patent: Apr. 19, 2005

(54) LAMP FOR VEHICLES

(75) Inventors: Ulrich Knaack, Paderborn (DE);
Lukas Schwenkschuster, Lippstadt (DE)

(73) Assignee: Hella KG Huech & Co., Lippstadt (DE)

( * ) Notice: Subject to any disclaimer, the term of this patent is extended or adjusted under 35 U.S.C. 154(b) by 204 days.

(21) Appl. No.: 09/955,428

(22) Filed: Sep. 19, 2001

(65) Prior Publication Data

US 2003/0026106 A1 Feb. 6, 2003

(30) Foreign Application Priority Data

Aug. 1, 2001 (DE) .......................... 101 37 605

(51) Int. Cl.⁷ ............................................. G01D 11/28
(52) U.S. Cl. ..................... 362/26; 362/31; 362/509; 362/511; 362/520; 362/551; 362/559
(58) Field of Search ........................... 362/26, 31, 509, 362/511, 520, 551, 559, 27, 555, 571

(56) References Cited

U.S. PATENT DOCUMENTS 6,356,394 B1 * 3/2002 Glienicke .................. 359/641

FOREIGN PATENT DOCUMENTS

| DE | 196 21 148 A1 | 12/1997 |
| DE | 196 43 784 A1 | 4/1998 |
| DE | 198 03 537 A1 | 9/1999 |
| DE | A1-19904644 | 8/2000 |
| EP | A2900694 | 3/1999 |

* cited by examiner

*Primary Examiner*—Sandra O'Shea
*Assistant Examiner*—Mark Tsidulko
(74) *Attorney, Agent, or Firm*—Birch, Stewart, Kolasch & Birch, LLP

(57) ABSTRACT

A lamp for a vehicle includes a light-conducting element. The light-conducting element has at least one in-coupling element arranged between two adjacent light out-coupling elements. A light source is associated with a light in-coupling surface of the light in-coupling element. At least two light-diverting surfaces of the light in-coupling element are associated with respective ones of the light out-coupling elements. The light-diverting surfaces serve to divert light beams radiated from the light source into the respective light out-coupling elements. The light-diverting surfaces of the light in-coupling elements are convexed, or curved, outwardly and have a common focus position for the light source.

19 Claims, 3 Drawing Sheets

LAMP FOR VEHICLES

BACKGROUND OF THE INVENTION

This application claims the priority of German patent application 101 37 605.7, filed in Germany on Aug. 1, 2001, and contents of that priority application are incorporated by reference herein.

The invention concerns a lamp for vehicles having a light conductor element which includes at least one light in-coupling element arranged between two adjacent light out-coupling elements, with a light source associated with a light in-coupling surface of the light in-coupling element, there being at least two light-diverting surfaces of the light in-coupling element, each associated with one of the light out-coupling elements and serving to divert light beams radiated from the light source toward the respective light out-coupling elements.

European patent EP 0900 694 A2 discloses a headlight for vehicles with a lamp for position light. The lamp comprises a ring-shaped light conductor element that surrounds a bowl-shaped reflector. The light conductor element has a light in-coupling element that is positioned between two adjacent light out-coupling elements and is coupled to a light conductor strand. Because the light conductor element is shaped to have a ring shape, and because it has only a single light in-coupling element, the two light out-coupling elements transition into one another. Each of the light out-coupling elements is provided with an out-coupling surface on a front-side facing a cover pane of the headlight and with a reflection surface at a backside. The light in-coupling element has two planar light diverting, or deflecting, surfaces and one light in-coupling surface. On the front side of the light in-coupling element there is a wedge-shaped depression that is bordered by the two planar light-diverting surfaces. The light in-coupling element on the backside of the light conductor element extends far toward the rear, and transitions into a light conductor strand. A light source is associated with a light in-coupling surface of the light conductor strand. The light in-coupling element tapers conically toward its rearward end and has there a light in-coupling surface. Through the conically extending portion of the light in-coupling element, outgoing diverging light from the light source is directed as parallel as possible. Only the parallel-extending light falling on the planar light-diverting surfaces will be transported far into the light out-coupling element before it is out-coupled. A larger portion of the in-coupled light is no longer parallel because of the outgoing diverging light from the light source and because of multiple reflections in the light in-coupled element. Because the non-parallel extending light, after one reflection on the planar light reflection surface does not extend far into the light out-coupling element, or it is lost, if the light out-coupling element is long, a uniform illumination cannot be achieved.

German patent document DE-A-199 04 644 discloses a lamp that is comprised of a plurality of light conductor elements placed at one another. The light conductor elements have an elongated light out-coupling element and a light in-coupling element. The light in-coupling element has a single outwardly-bulged, or curved, light-diverting surface with a light source arranged at its focus position. A light diode serves as the light source. The curved light-diverting surface bundles various light beams of the light diode. Thus, these go far into the light out-coupling element and the light out-coupling element is uniformly illuminated. In order to achieve a long light out-coupling element it is necessary to arrange a plurality of light-conducting elements side-by-side.

It is an object of this invention to improve a lamp for a vehicle of a type having a light conductor element which has at least one light in-coupling element arranged between two adjacent light out-coupling elements, with a light source associated with a light in-coupling surface of the light in-coupling element, with at least two light-diverting surfaces of the light in-coupling element, with each associated with one of the light out-coupling elements and serving to divert light rays radiating from the light source to the respective light out-coupling elements, in such a manner that as much light as possible from the light-source received by the light in-coupling element reaches as far as possible into the light out-coupling element, but with the light out-coupling element not being a protruding component, that is not protruding far from the backside of the lamp.

SUMMARY OF THE INVENTION

According to principles of this invention the light-diverting surfaces of the light in-coupling element are curved, or domed, outwardly and have a common focus position for the light source. The light source can be arranged quite close to the light-diverting surfaces because the outwardly diverging light from the light source is not only diverted but it is also bundled. The light can be so strongly bundled that variously diverted light beams enter into the light out-coupling element. When the light-conducting element is ring shaped with a single light in-coupling element that has two light-diverting surfaces, both light out-coupling elements associated with the light-diverting surfaces can transition into one another.

A lamp according to this invention needs no additional housing if the light conductor element is arranged in an interior space of a headlight or a rear lamp. In this regard, it is beneficial for the light out-coupling element to be arranged in a lower area of the headlight. Because the lower area of a headlight is the coolest part of the headlight, a heat-sensitive light source can also be used, for example a light diode can be used.

In order to maintain the most homogenous illumination even with a very long or very large ring-shaped light-conducting element, it is further beneficial for the light conductor element to have a plurality of light in-coupling elements spaced from one another. When this is done, the light out-coupling elements arranged between the lights in-coupling elements should have the same length.

The lamp has a small structural profile if the smallest spacing of the light in-coupling surface from the light-diverting surfaces is smaller than a structural depth of the light out-coupling elements. In this regard, the light in-coupling surface can extend flush with a surface bordering a backside of the light out-coupling element or can be arranged between the surfaces that border the front and back sides of the light out-coupling element.

In a particularly beneficial further embodiment of the invention, the light conductor element is associated with a reflector and it is a component that covers the light source, with light out-coupling surfaces of the light conductor element facing a reflection surface of the reflector and light beams exiting from the light out-coupling surfaces falling on a reflection surface of the reflector. Because the light conductor element is associated with a reflector, only a very short light out-coupling element is necessary. A second diversion then does not take place via a reflection surface of the light out-coupling element, rather via the reflector. The benefit here is that only one short light out-coupling element is necessary and the otherwise long light out-coupling element is substantially replaced by a simply structured and cost effectively manufactured reflector. Further, one can achieve an additional degree of freedom in homogeneously illuminating about the reflector if the light out-coupling surface of the light out-coupling element is provided with additional optical elements.

Further, it is beneficial if the light-diverting surfaces extend parabolically, with rotation axes of these paraboloids extending into the respective out-coupling elements. The light-diverting surfaces are partial sections of a paraboloid that direct the light from the light source arranged at a focus position of the light-diverting surfaces parallel to the light out-coupling element. The diverted light stream is then led into the light out-coupling element and exits there, after one reflection on a rearward reflection surface, from a front light exit surface. If the light conductor element is ring-shaped with only one light source, and one light in-coupling element, a homogeneous illumination of the entire light conductor element can be achieved.

It is also beneficial for the light-diverting surfaces to extend elliptically, with the light source being arranged at a common first focus position, or point, of the light diverting surfaces and second focus areas lying on a line that extends into the respective light out-coupling elements. When this is done, it is beneficial for the second focus positions to be pre-positioned close to the respective light out-coupling elements or to lie within the light out-coupling elements. In this manner also then the entire diverted light will be coupled into the light out-coupling elements even if they have a small cross section.

It is further beneficial for the light in-coupling element to have at least three diverting surfaces, each having a light out-coupling element associated with it. The same-size portion of a light stream will be diverted into each of the light out-coupling elements if the light out-coupling elements bordering a light in-coupling element extend at a same-size angle to one another.

In the same manner, it is beneficial for the light-diverting surfaces, that totally reflect the light of the light source, to be provided with at least one light decoupling element. Because the light on the light-diverting surfaces is reflected by total reflection, an area that otherwise looks dark from the outside is made light with the help of the light decoupling element. Deflecting surfaces in the diverting surfaces can serve as light decoupling elements, such as, for example, prisms, grooves or ribs. The light conductor element has also, in both an on and an off switched position, a homogenous appearance, also in the area of the light-diverting surfaces if, when seen from the front side of the light conductor element, the light decoupling elements of the front light-diverting surfaces has a definite pattern, for example a striped-shaped pattern that continues in a rearward reflection surface of the light out-coupling element.

By arranging a plurality of light diverting and light out-coupling elements in series, an illumination band is created that is structurally quite flat, even in the area of the light in-coupling element by using a light diode. By use of a light diode, the light in-coupling surface can be maintained quite small. The light-diverting surfaces can be made to be small in this way and by having optical elements on the light in-coupling surface. The light-conducting element can be manufactured in a cost effective manner if the light in-coupling and out-coupling elements are made as a single piece light guide element.

The lamp for vehicles can also be arranged in an interior space of a vehicle and can serve as interior-space illumination or orientation illumination. A lamp used for orientation can be extended along or about a control panel element or dashboard.

BRIEF DESCRIPTION OF THE DRAWINGS

The invention is described and explained in more detail with reference to the drawings. The described and drawn features can be used individually or in preferred combinations in other embodiments of the invention. The foregoing and other objects, features and advantages of the invention will be apparent from the following more particular description of the invention, as illustrated in the drawings in which reference characters refer to the same parts throughout the different views. The drawings are not necessarily to scale, emphasis instead being placed upon illustrating principles of the invention in a clear manner.

DETAILS OF THE INVENTION

Figure 1:
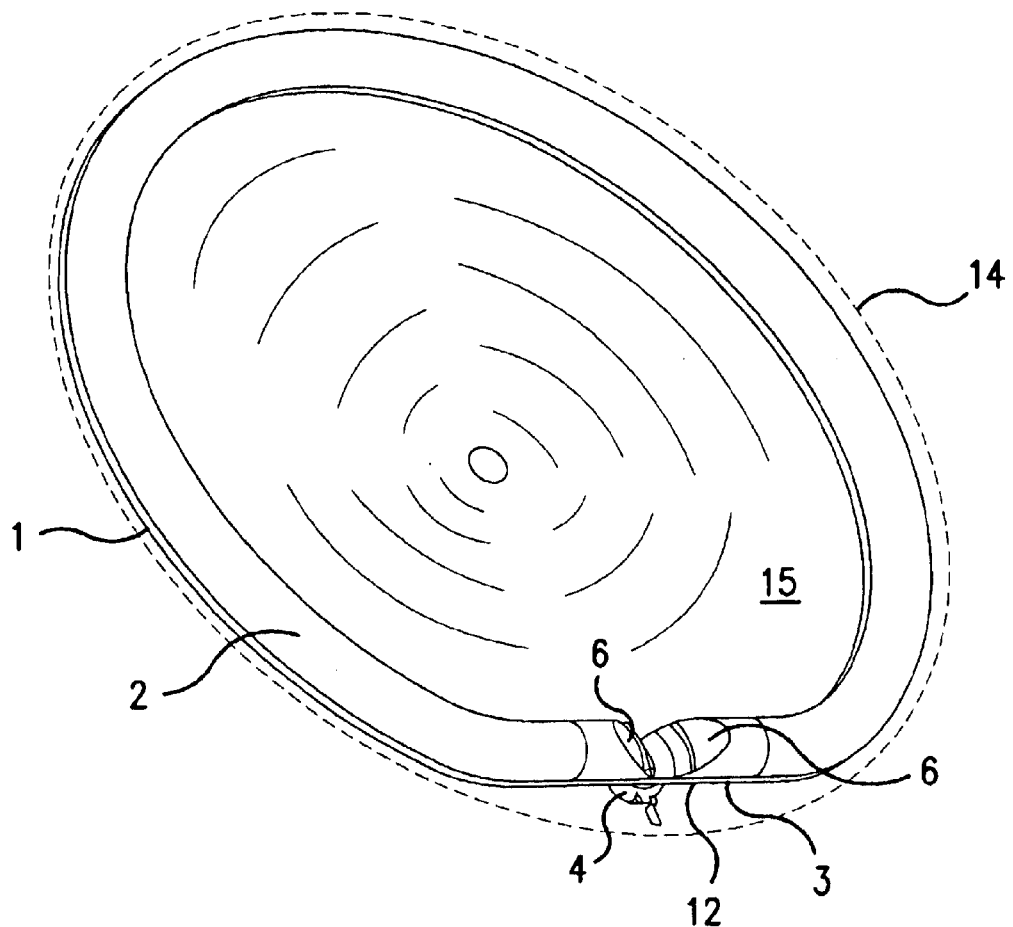
FIG. 1 is a prospective view of a ring-shaped light conductor element with one light in-coupling element and a light source associated with the light in-coupling element.

The lamp depicted in FIG. 1 serves as a position light and has a ring-shaped light conductor element. The lamp is intended for use with a headlight 14. The ring-shaped light conductor 1 encircles a lens of a light module in an interior space of the headlight 14. The ring-shaped light conductor element 1 can also encircle a bowl-shaped reflector 15. The light conductor element 1 has a single light in-coupling element 3 with a light source 4 associated therewith. A light diode serves as the light source 4. The light in-coupling element 3 and the light source 4 are arranged below the light module and a separate part of the light guide element 1. The light in-coupling element 3 is placed between two light out-coupling elements 2 that have a circular-shaped cross section; together they form an open ring and transition into one another because of the ring shaped structure.

Figure 2:
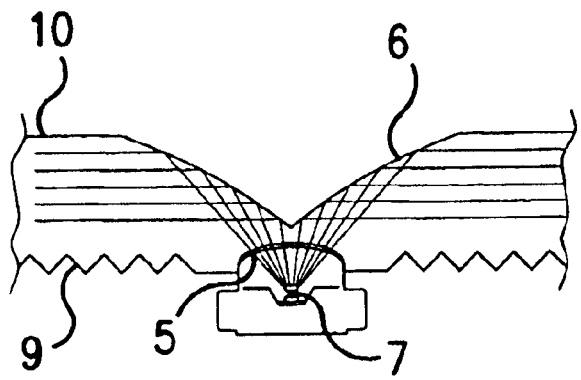
FIG. 2 is a center lengthwise cross-sectional view of a light in-coupling element having parabolic light-diverting surfaces.
Figure 3:
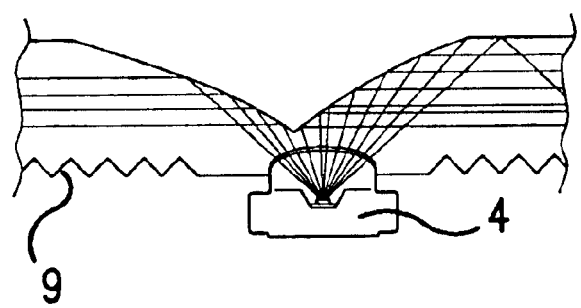
FIG. 3 is a center lengthwise cross-sectional view of a light in-coupling element with different sized parameters, or P/2.
Figure 4:
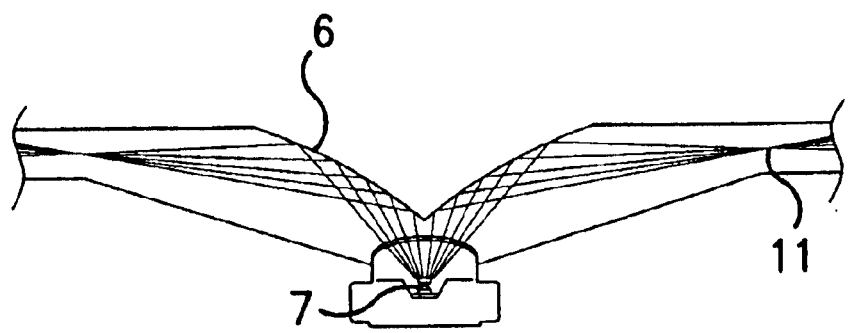
FIG. 4 is a center lengthwise cross-sectional view of a light in-coupling element having elliptically shaped light-diverting surfaces.

Three different light in-coupling elements 3 are shown in FIGS. 2, 3 and 4. Each light in-coupling element 3 has a wedge-shaped depression at a front side of the light conductor element 1 whose both side surfaces are light-diverting surfaces 6. The light-diverting surfaces 6 are curved, or domed, outwardly and bundle the light radiated from the light source 4. In this manner the entire light radiated from the light source 4 can be coupled into the light out-coupling elements 2. The light in-coupling element 3 has on the backside of the light conductor element 1 a light in-coupling surface 5 that is formed as a trough-like depression in the light in-coupling element 3. The light source 4 is arranged adjacent the light in-coupling surface 5. A light cone radiates outwardly from the light source 4, which is a light diode, and falls completely on the light-diverting surface. By bundling the light at the light-diverting surfaces 6 the light reaches far into the light out-coupling elements 2. In each light out-coupling element 2, the light is reflected from a rearward reflection surface 9 toward a light out-coupling surface 10. Because the light reaches far into the light out-coupling elements 2, the ring-shaped light conductor 1 is illuminated throughout its entire perimeter.

The light in-coupling element 3 of FIG. 2 has parabolic light-diverting surfaces 6 that are sections of a paraboloid. The rotation axes of the paraboloids extend central into the respective adjacent light out-coupling elements 2. In this manner a homogeneous illumination of the light out-coupling elements 2 is achieved. The optical axis of the light source 4 extends in a symmetry plane of the light out-coupling elements 2 with the symmetry plane extending through a trough of the wedge-shaped depression, defined by the two light-diverting surfaces 6, and central to the light in-coupling surface 5. In this manner, the same amount of light from a light cone radiated from the light source 4 is guided into each of the light out-coupling elements 2.

For the light in-coupling element 3 of FIG. 3, the optical axis of the light source 4 is spaced from the base of the wedge-shaped depression. Because of this, portions of the light cone guided to the two light out-coupling elements are of different sizes.

The light in-coupling element 3 according to FIG. 4 has two elliptical light-diverting surfaces 6. At a first focus position, or point, 7 of the elliptical light-diverting surfaces 6 there is a light source 4, with two focus positions, or points, 11 of the elliptical light-diverting surfaces 6 lying on a line that extends centrally into the respective light out-coupling elements 2. The two focus positions 11 respectively lie in zones of the light-conducting element 1 that couples the light in-coupling element 3 with the respective light out-coupling elements 2.

Figure 5:
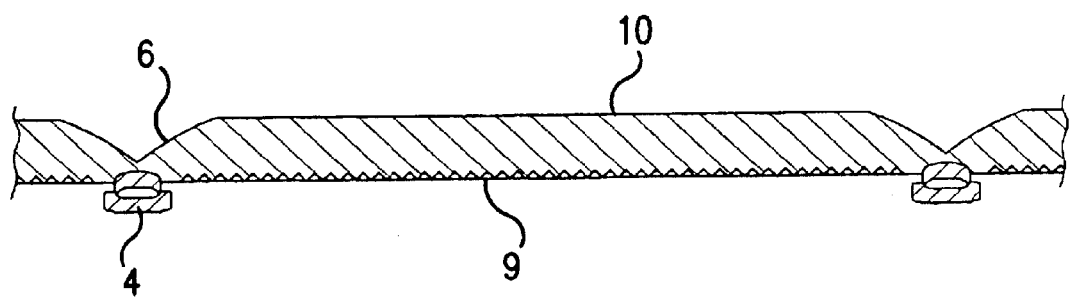
FIG. 5 is a center lengthwise cross-sectional view of an elongated light conductor element with two light in-coupling elements.

An elongated light-conducting element 1 is depicted in FIG. 5 that has two light in-coupling elements 3. Both of the light in-coupling elements 3 are arranged between elongated light out-coupling elements 2 having circular cross-sections. Respective ones of the light out-coupling elements 2 join the two light in-coupling elements 3. The light out-coupling elements 2 and the light in-coupling elements 3 are constructed of a single-piece light-conducting element 1.

Figure 6:
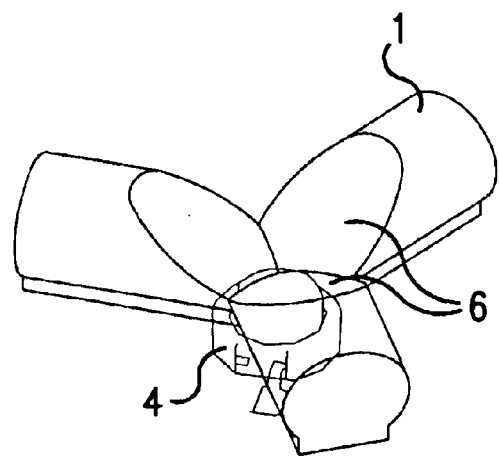
FIG. 6 is a perspective view of a light in-coupling element with three light-diverting surfaces.

The light in-coupling element of FIG. 6 has a light source 4 and three light-diverting surfaces 6 with which the light can be respectively diverted into any one of a total of three elongated light out-coupling elements 2.

Figure 7:
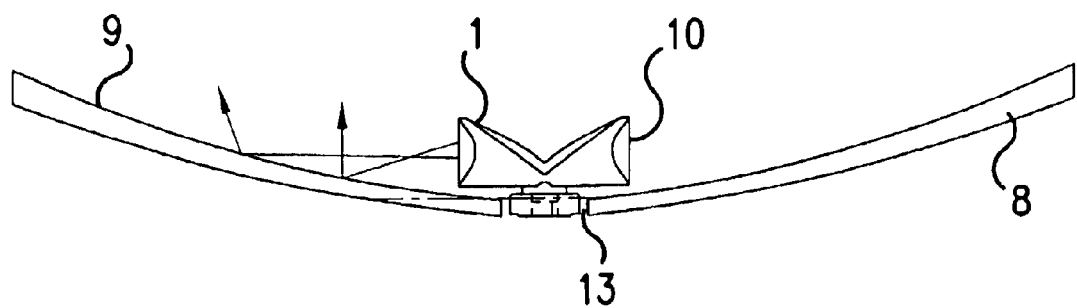
FIG. 7 is a center lengthwise cross-sectional view of a bowl-shaped reflector in which a light conductor element is placed.

The light-conducting element 1 of FIG. 7 is associated with a central opening 13 of a bowl-shaped and rectangularly-structured reflector 8. The opening 13 of the reflector 8 serves to receive the light source 4. The opening 13 is covered by the light conductor element 1. The light in-coupling element 3 has two light-diverter surfaces 6 that respectively divert the light of the light source 4 to ones of the light out-coupling surfaces 10 that extend perpendicular to the light beams reflected from the light-diverting surfaces 6. The light beams exiting from the light out-coupling surfaces 10 fall on a reflection surface 9 of the reflector 8 that diverts the light beams in a desired direction.

Referring again to FIG. 1, when a light-diverting surface 6 totally reflects the light of the light source 4, it is beneficial to provide at least one light decoupling element 12. If a light decoupling element 12 is not provided, the outer surface of the light conductor element 1, located behind the light-diverting surface 6, will appear dark because the light reaching the light-diverting surface 6 is totally reflected. The light decoupling element 12 allows the area behind the light-diverting surface 6 to show light. The light decoupling element 12 can be formed as a deflecting surface, such as a prism, groove or rib.

We claim:

1. Lamp for vehicles including: a light conductor element (1) that has at least one light in-coupling element (3) arranged between two adjacent light out-coupling elements (2), a light source (4) associated with a light in-coupling surface (5) of the light in-coupling element (3), at least two light-diverting surfaces (6) of the light in-coupling element (3) each being respectively associated with one of the light out-coupling elements (2) and serving to divert light beams radiated from the light source (4) toward the respective light out-coupling element (2), wherein the light-diverting surfaces (6) of the light in-coupling element (3) are curved outwardly and have a common focus position (7) for the light source (4), wherein the light conductor element (1) is structured to have a ring-shape, with the two light out-coupling elements (2) being formed from portions of the ring-shaped light conductor element (1) that border on the light in-coupling element (3) and transitioning into one another because of the ring-shaped structure of the conductor element (1), and wherein the light conductor element is in an interior space of one of a headlight and a taillight.

2. Lamp according to claim 1 wherein the light in-coupling surface (5) of the light in-coupling element (3) is arranged in a lower half of the one of the headlight and the taillight.

3. Lamp according to claim 2 wherein the light conductor element (1) has a single light in-coupling element (3), with the light in-coupling element (3) and the light out-coupling elements (2) being made of a one piece light conductor element (1), and with the light source (4) being a light diode.

4. Lamp as in claim 1 wherein the light conductor element (1) has a plurality of light in-coupling elements (3) spaced from one another.

5. Lamp according to claim 1 wherein a smallest spacing of the light in-coupling surface (5) from the light-diverting surfaces (6) is a maximum of one and a half times a structural depth of the light out-coupling element (2).

6. Lamp according to claim 5 wherein the smallest spacing of the light in-coupling surface (5) from the light-diverting surfaces (6) is smaller than the structural depth of the light out-coupling element (2).

7. Lamp according to claim 1 wherein the light conductor element (1) is associated with a reflector (8) and forms a component that covers the light source (4), with light out-coupling surfaces (10) of the light out-coupling elements (2) facing a reflection surface (9) of the reflector (8) and light beams exiting from the light out-coupling surfaces (10) falling on the reflection surface (9) of the reflector (8).

8. Lamp according to claim 1 wherein the light-diverting surfaces (6) extend parabolically, with rotation axes of the paraboloids extending into the respective light out-coupling elements (2).

9. Lamp according to claim 1 wherein the light-diverting surfaces (6) extend elliptically, with the light source (4) being arranged at a common first focus position (7) of the light-diverting surfaces (6) and two focus positions (11) lying on a line that extends into the respective light out-coupling elements (2).

10. Lamp according to claim 1 wherein the light in-coupling element (3) has at least three light-diverting surfaces (6), each being respectively associated with a light out-coupling element (2).

11. Lamp according to claim 1 wherein the light-diverting surfaces (6) that totally reflect light from the light source (4) are provided with at least one light decoupling element (12).

12. Lamp according to claim 1 wherein at least one of the light-diverting surfaces (6) of the light in-coupling element (3) is offset from an optical axis of the light source (4).

13. Lamp for vehicles including: a light conductor element that has at least one light in-coupling element arranged between two adjacent light out-coupling elements, a light source associated with a light in-coupling surface of the light in-coupling element, at least two light-diverting surfaces of the light in-coupling element each being respectively associated with one of the light out-coupling elements and serving to divert light beams radiated from the light source toward the respective light out-coupling element, wherein the light-diverting surfaces of the light in-coupling element are curved outwardly and have a common focus position for the light source, and wherein a smallest spacing of the light in-coupling surface from the light-diverting surfaces is a maximum of one and a half times a structural depth of the light out-coupling element.

14. Lamp according to claim 13 wherein the smallest spacing of the light in-coupling surface from the light-diverting surfaces is smaller than the structural depth of the light out-coupling element.

15. Lamp for vehicles including: a light conductor element that has at least one light in-coupling element arranged between two adjacent light out-coupling elements, a light source associated with a light in-coupling surface of the light in-coupling element, at least two light-diverting surfaces of the light in-coupling element each being respectively associated with one of the light out-coupling elements and serving to divert light beams radiated from the light source toward the respective light out-coupling element, wherein the light-diverting surfaces of the light in-coupling element are curved outwardly and have a common focus position for the light source, and wherein the light conductor element is associated with a reflector and forms a component that covers the light source, with light out-coupling surfaces of the light out-coupling elements facing a reflection surface of the reflector and light beams exiting from the light out-coupling surfaces falling on the reflection surface of the reflector.

16. Lamp for vehicles including: a light conductor element that has at least one light in-coupling element arranged between two adjacent light out-coupling elements, a light source associated with a light in-coupling surface of the light in-coupling element, at least two light-diverting surfaces of the light in-coupling element each being respectively associated with one of the light out-coupling elements and serving to divert light beams radiated from the light source toward the respective light out-coupling element, wherein the light-diverting surfaces of the light in-coupling element are curved outwardly and have a common focus position for the light source, and wherein the light-diverting surfaces extend elliptically, with the light source being arranged at a common first focus position of the light-diverting surfaces and two focus positions lying on a line that extends into the respective light out-coupling elements.

17. Lamp for vehicles including: a light conductor element that has at least one light in-coupling element arranged between two adjacent light out-coupling elements, a light source associated with a light in-coupling surface of the light in-coupling element, at least two light-diverting surfaces of the light in-coupling element each being respectively associated with one of the light out-coupling elements and serving to divert light beams radiated from the light source toward the respective light out-coupling element, wherein the light-diverting surfaces of the light in-coupling element are curved outwardly and have a common focus position for the light source, and wherein the light in-coupling element (3) has at least three light-diverting surfaces (6), each being respectively associated with a light out-coupling element (2).

18. Lamp for vehicles including: a light conductor element that has at least one light in-coupling element arranged between two adjacent light out-coupling elements, a light source associated with a light in-coupling surface of the light in-coupling element, at least two light-diverting surfaces of the light in-coupling element each being respectively associated with one of the light out-coupling elements and serving to divert light beams radiated from the light source toward the respective light out-coupling element, wherein the light-diverting surfaces of the light in-coupling element are curved outwardly and have a common focus position for the light source, and wherein the light-diverting surfaces that totally reflect light from the light source are provided with at least one light decoupling element.

19. Lamp for vehicles including: a light conductor element that has at least one light in-coupling element arranged between two adjacent light out-coupling elements, a light source associated with a light in-coupling surface of the light in-coupling element, at least two light-diverting surfaces of the light in-coupling element each being respectively associated with one of the light out-coupling elements and serving to divert light beams radiated from the light source toward the respective light out-coupling element, wherein the light-diverting surfaces of the light in-coupling element are curved outwardly and have a common focus position for the light source, and wherein at least one of the light-diverting surfaces of the light in-coupling element is offset from an optical axis of the light source.

* * * * *